April 27, 1965
L. G. OXFORD
3,180,005
CUTTING OR ABRADING TOOLS
Filed Aug. 4, 1960
3 Sheets-Sheet 1
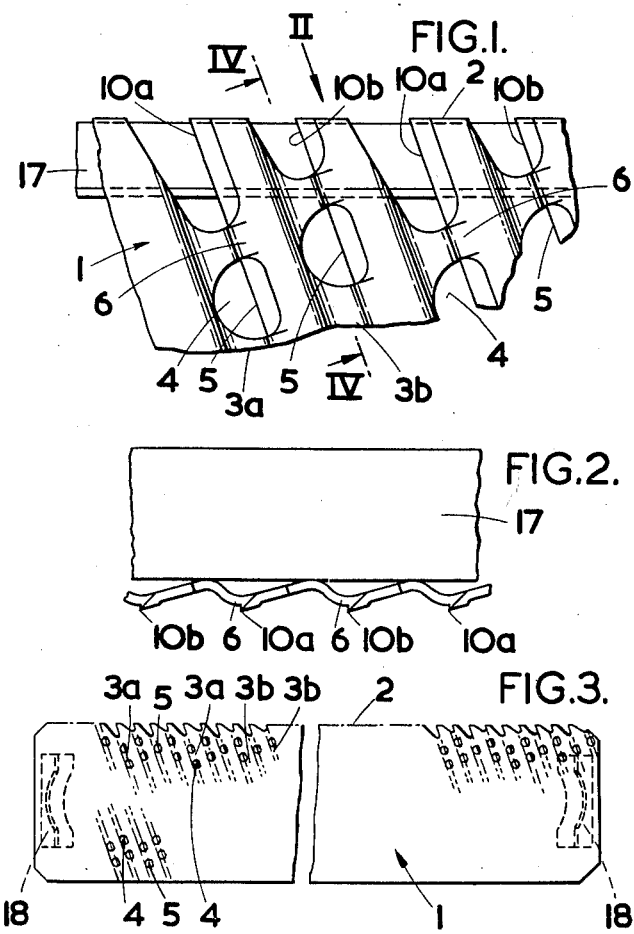

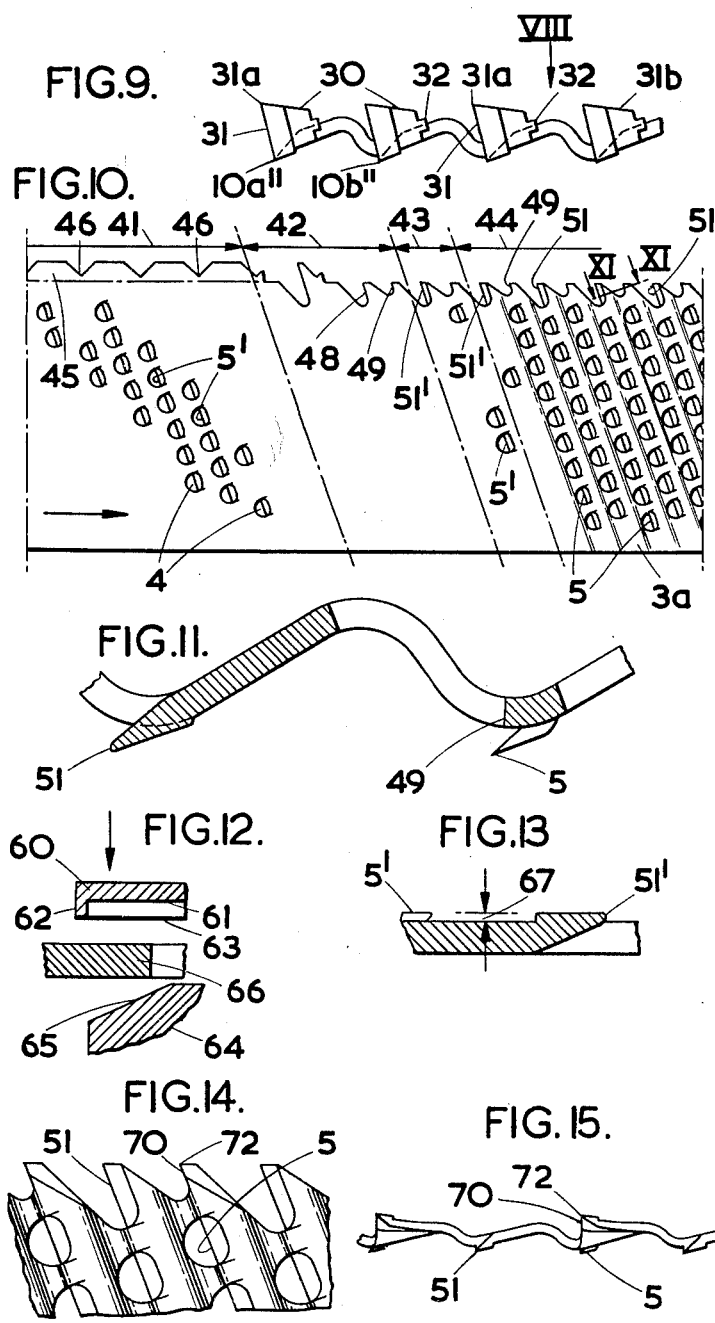

United States Patent Office 3,180,005
Patented Apr. 27, 1965

3,180,005
CUTTING OR ABRADING TOOLS
Leonard G. Oxford, Cardiff, Wales, assignor, by mesne assignments, to Stanley Works (Great Britain) Limited, Sheffield, England
Filed Aug. 4, 1960, Ser. No. 47,543
Claims priority, application Great Britain, Dec. 21, 1956, 39,111/56
9 Claims. (Cl. 29—78)

This invention relates to cutting elements, and is a continuation-in-part of my application No. 704,745 filed December 23, 1957, now U.S. Patent No. 3,000,077. United States Patent No. 2,678,571 (Booth) describes a cutting element (hereinafter referred to as of "the kind described"), comprising a thin flexible strip of hardenable ferrous material having a multiplicity of holes formed therein in rows and sharp cutting edges upset from the strip of which each is constituted by portions of the edge of a hole and is sharpened and hardened, the strip being reversely bent along lines parallel to the rows of holes into a succession of ridges with the sharpened edges extending from the ridges in the same general direction above the general plane formed by the ridges and at a suitable angle for cutting, to the said plane, and the cutting edges in the various rows being so located on the strip that when the strip is moved over work in one direction said edges cut over a continuous area.

Cutting elements according to the aforesaid United States patent are commonly mounted on a backing member providing a handle and a pair of spaced parallel narrow strip-like supporting surfaces in contact with the rear surface of the side edge portions of the cutting element so as to prevent its flexing in use, these edge portions having no holes or teeth. For some uses it is a disadvantage of such a hand tool that the area of the element carrying cutting edges does not extend to a side edge of the element, e.g. for cutting up to corners, and one object of the invention is to overcome this disadvantage. A subsidiary object of the invention is to provide a cutting element suitable for use as a saw as well as an abrading tool.

The invention accordingly provides a cutting element in strip form of the kind described wherein at least one side edge of the strip portions are cut away to leave side cutting edges, adapted to cut work over an area which is continuous with said area over which the other edges of the element cut and extends up to said side edge. If the cutting edges just described are provided simply by shearing cut-outs along the side edge they will cut up to the side edge of the element, in use thereof to abrade, for example, up to a shoulder; however the side cutting edges will be less efficient than the cutting edges at the holes. To overcome this disadvantage, to some extent at least, it is preferred that said cutting edges extend from the ridges above the general plane formed thereby and at a suitable angle for cutting, to said plane, each cutting edge being aligned with the corresponding ridge, and facing in the same general direction as the sharpened edegs of the holes.

Various embodiments of the invention will now be described by way of example with reference to the accompanying diagrammatic drawings, in which:

FIGURE 1 is a plan view, taken from the side which in use will go against the work, of a small edge portion of a cutting element for use in a hand abrading tool of file or rasp type, the element having side cutting edges at one side edge only—the figure shows also a portion of a backing member;

FIGURE 2 is a side view of what is shown in FIGURE 1, the view being taken in the direction of the arrow II in FIGURE 1;

FIGURE 3 is a plan view of the entire cutting element on a smaller scale than that of FIGURES 1 and 2;

FIGURE 4 is a section of the cutting element supported on a backing member the section being taken along one of the ridges as shown at IV—IV in FIGURE 1;

FIGURES 8 and 9 are plan and side views of a cutting element which, besides acting as a file or rasp can also be used as a saw; unlike FIGURE 1, FIGURE 8 is a plan view from the side opposite that which will be applied to the work in use of the cutting element as a file or rasp, and no backing member is shown—the arrow IX in FIGURE 8 shows how the view of FIGURE 9 is taken;

FIGURE 10 is a plan view, from the side which will eventually be applied to work, of a cutting element in process of formation;

FIGURE 11 is a scrap section of a side cutting edge of the finished FIGURE 10 cutting strip, the sections being taken as shown by the line and arrow XI—XI in that figure;

FIGURE 12 is a scrap section taken on a plane parallel to that of FIGURE 11 and showing diagrammatically a punching step for the formation of the FIGURE 11 edge;

Figure 8:
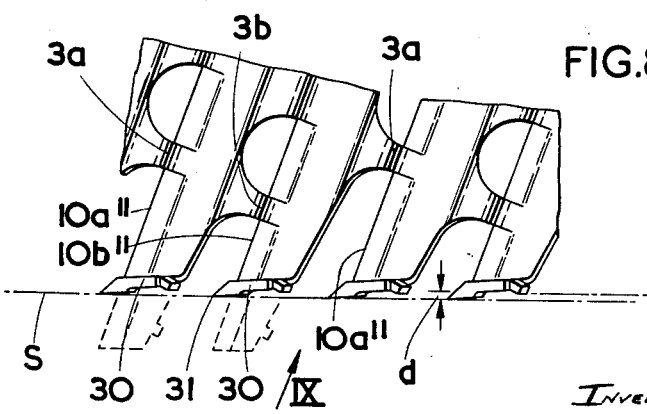

FIGURE 13 is a scrap section showing the result of the FIGURE 12 punching operation, and FIGURES 14 and 15 are views similar to FIGURES 1 and 2 showing a further form of cutting element which, like that of FIGURES 8 and 9, can be used both as a file or rasp and as a saw.

Referring to the drawings, the cutting element designated generally 1, is generally similar apart from the portion adjacent one edge 2, to the element described in the aforesaid United States Patent No. 2,678,571 both in configuration and manufacture. Features common to the illustrated blade 1 and that of the Patent No. 2,678,571 will therefore not be discussed in detail. As will be seen the cutting element 1 is in the form of a strip and has a series of parallel rows 3a, 3b of holes 4 running obliquely to the length of the element, each hole having one straight side 5 parallel to the rows 3a, 3b and sharpened to form a cutting edge. The strip is reversely bent along lines parallel to the rows 3a, 3b into a succession of ridges 6 with the sharpened edges 5 extending from the ridges above the general plane formed by the ridges and at a suitable angle for cutting, to the said plane.

The holes 4 in alternate rows 3a or 3b are similarly placed but the holes in one row (say 3a) are staggered in relation to the holes in the rows (3b) next before and behind to ensure cutting over the whole of the area of the element 1 which contains holes.

The portion of the element adjacent the edge 2 is cut away in a general saw-tooth pattern to leave a series of edges 10a, 10b (one for each ridge 6) parallel to the rows 3a, 3b each of the edges 10a, 10b lying level and parallel to the edges 5 in one of the rows 3a, 3b.

The edges 10a, 10b are alternately long and short, and the cut-away portions alternately large and small depending on the distance from the side edge 2 to the corresponding hole 4 nearest thereto. The longer cutting edges 10a all extend from the side edge 2 sufficiently inwardly thereof so that when the element 1 is moved forwardly over work to be cut the longer cutting edges 10a and the sharpened edges 5 of the extreme holes 4 in the intervening rows 3b leave no uncut work between them. The sizes of the cut-away portions are such that the cutting edges 10a, 10b are adequately supported in the direction of cut and such that enough of the troughs between the ridges 6 are left whereby when the element is assembled on the backing member (as described below) each trough is received thereon.

As has been mentioned, the cutting element is made by the method disclosed in United States Patent No. 2,678,571; the portions at edge 2 between the ridges 6 are cut out in the same operation as that in which the holes 4 are formed, and the cutting edges 10a, 10b are formed in the same operations as the sharpened edges 5 of the holes 4 and have the same rake and clearance angles.

The element 1 is supported on a backing member 15 (FIGURE 4) so that the combination provides a hand tool (not shown in its entirety). The backing member 15 consists of rigid side members 16, 17 interconnected at their ends, each member underlying the portion of the element 1 the adjacent one of its side edges. The member 17 adjacent the side edge 2 is chamfered so as to support the element over spaced parts of a line as opposed to spaced parts of an area as is the case with the side member 16 and the opposite side portion of the element. Thus swarf cut by any of the edges 5, 10a, 10b is able to escape through to the rear of the element 1.

Lugs 18 on the rear side of the element enable it to be detachably secured to the backing member, by the application of tension to the lugs.

The cutting element 1 of FIGURES 1 to 4 may be modified to have side cutting edges 10a, 10b on each side.

Figure 5:
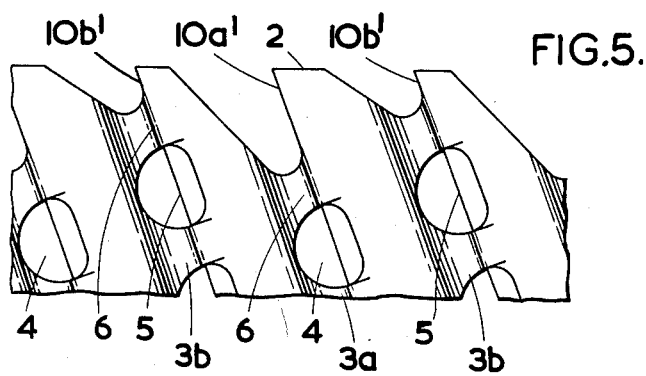
FIGURES 5 and 6 are views similar to FIGURES 1 and 2 fo a simplified form of the cutting element of FIGURES 1 to 4.
Figure 6:
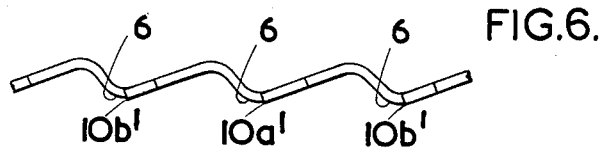

FIGURES 5 and 6 show a simplified form of the cutting element of FIGURES 1 to 4 where the side cutting edges are not subjected to the same upsetting and grinding operations as are performed in the production of the cutting edges 5.

Parts similar to those of FIGURES 1 to 4 are given the same reference numerals, but the side cutting edges are designated 10a¹, 10b¹, and are simply sheared at the side edge 2; this shearing need not be done when the holes 4 are formed but may instead be effected at the same time as an indexing margin is removed from the side of the element. (Such a margin is described and illustrated below.)

Though this form of element shown in FIGURES 5 and 6 is obviously less satisfactory than the element 1 of FIGURES 1 to 4, it will be sufficient for some purposes.

Figure 7:
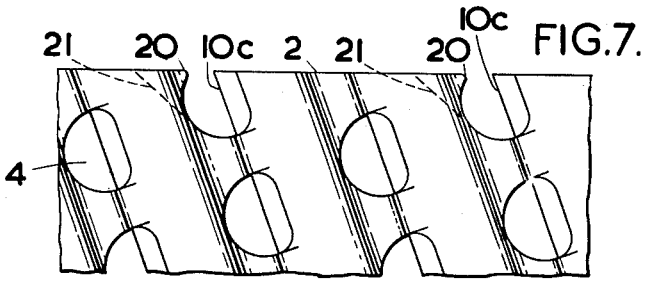
FIGURE 7 is a view similar to FIGURE 1 of a further form of cutting element.

The element illustrated in FIGURE 7 is made by forming an element which extends beyond the desired final width and shearing it off longitudinally to form the side edge 2 (parts similar to those of FIGURES 1 to 4 are given the same reference numerals). This produces one side cutting edge 10c at alternate ribs, instead of one at every rib as in FIGURES 1 to 4. To eliminate the weak and useless points 20 it is preferred to shear the strip along the lines shown dotted at 21.

FIGURES 8 and 9 show a cutting element which can be used as a file or rasp in the same way as the element of FIGURES 1 to 4, but which can also be used as a saw by reciprocation of the element in its own plane. The element presents at alternate ridges 3a, 3b alternately long and short side cutting edges 10a″, and 10b″ which are similar in rake and clearance angles and in projection to the cutting edges 5 at the holes 4, and give the element a cutting area which extends right up to the side of the element indicated by the line S. The element of FIGURES 8 and 9 differs from that of FIGURES 1 to 4 by having tongues 30 projecting upwardly and very slightly forwardly from the plane containing the cutting edges 5, 10a″ and 10b″. Each tongue 30 has at its front a cutting edge 31 generally similar to the other cutting edges, having positive rake and clearance angles, and extending the whole thickness of the element to terminate in tips 31a which lie just beyond the plane containing the crests of the ridges on that side of the element which lies away from the work. The end faces 31b of the tongues 30 slope inwardly and rearwardly to give clearance. The rear of the tongues 30 are formed with bent-out lugs 32.

The tongues are initially sheared out of flat strip as shown by the dotted lines, this shearing taking place in the same operation as that in which the holes 4 are formed. The cutting edges 31 are formed as continuations of the side cutting edges 10a″, 10b″; all the cutting edges are formed simultaneously in successive pressing down and grinding operations. Preferably before ridging the tongues 30 are bent sharply through a right angle on line S from the dotted-line position into that shown in full lines. Once again, for details of the manufacturing operations United States Patent No. 2,678,571 is referred to.

In operation to cut work by means of the edges 5, 10a″, 10b″ the cutting element of FIGURES 8 and 9 operates exactly like that of FIGURES 1 to 3. When the element is used as a saw, it is reciprocated in its own general plane so that the edges 31 are chiefly operative. The lugs 32 prevent the edges 31 from cutting beyond a predetermined depth shown at d; binding in the groove will not occur because of the cutting edges 5 and 10a″, 10b″, which will cut against the side of the groove on any tendency to bind, and thus suitably enlarge the groove if necessary.

An endless band of cutting strip such as shown in FIGURES 8 and 9 may be used as a band saw, using conventional reversing rollers, drive means and support in the working position.

FIGURE 10 shows a further form of cutting element in course of production. Zone 41 indicates strip being fed to a multiple punch operating at zones 42, 43 and 44. The strip in zone 41 has holes 4 and cutting edges 5′; the edges are slightly proud of the body of the strip and fully formed except that they have zero clearance angle, as shown in FIGURES 5 and 6 of United States Patent No. 2,678,571. The strip in zone 41 has a marginal area 45 with indexing notches 46 whereby the strip is correctly registered in the multiple punch.

In zone 42 the marginal area 45 is removed, leaving alternate long and short tongues 48, 49 level with the body of the strip. In zone 43 the longer tongues 48 are subjected to a coining operation to provide edges 51′ (FIGURE 11) on those tongues. The coining operation, shown in more detail in FIGURE 12, is effected by a punch 60 providing a flat horizontal area 61 and a pair of lands 62, 63 at right angles to one another, and a die 64 having a sloping face 65. The stroke of the punch is adjusted to bring the punch 60 and die 64 together until the surfaces 61, 65 nearly, but not quite, touch. As a result the metal 66 of the tongue 48 is squeezed to form the edge 51′, which is somewhat rounded. The rake and clearance angles, as well as the projection 67, of the edge 51′ are approximately the same as those of the edges 5′.

In zone 44 the strip is corrugated, as described with reference to FIGURES 7 to 12 of United States Patent No. 2,678,571. As a result, the final rake and clearance angles of the edges 5 and 51′ are generally similar, together with their projection beyond the crests of the ridges 3a, 3b. The tongues 49 are inoperative, as shown, but could if desired be subjected to the same operations as those performed on the tongues 48.

The completed cutting strip shown at zone 44 in FIGURE 10 is preferably used with a backing member which is not cut back as is the side member 17 of FIGURE 4. It will be appreciated that the cutting action of the edges 51 is less efficient than that of the edges 5: in fact the edges 51 tend to abrade rather than to cut. The action of the teeth 51 is however satisfactory for most purposes and has the advantage that whereas a true cutting edge (i.e. such as the edges 5) would tend to produce chips that wedge between the cutting element and the adjacent side member of the backing member, the chips produced by the edge 51 do not have this effect. Even in the FIGURE 4 arrangement with the cut-back side member 17 there is some danger of chips getting between it and the cutting element, and it is considered in many cases worth while to sacrifice some cutting efficiency of the side cutting edges to avoid this danger, with its attendant risk of fracture of the cutting element.

FIGURES 14 and 15 show a cutting element similar to that shown at zone 44 of FIGURE 10, but with cutting edges 70, similar to the edges 51, formed on the tongues 49. These cutting edges 70 do not cut in the same plane as the cutting edges 71, but extend partway across the thickness of the element to present their tips 72 somewhat proud of the general plane containing the crests of the ridges at the side of the element opposite the work. Thus, like the element of FIGURES 8 and 9, the element of FIGURES 14 and 15 can cut both in its general plane and also perpendicularly thereto, like a saw. The element of FIGURES 14 and 15 is inferior to that of FIGURES 8 and 9 because not only are the edges less efficient but there is a part of the thickness of the element over which no cutting edge extends. However for many purposes the element of FIGURES 14 and 15 is perfectly adequate, and it is easier to produce: this element, too, can be used as a band saw if desired.

It will be noticed that in each form of cutting strip described there is a cut-out preceding each side cutting edge. The margin of each cut-out starts from the side of the strip at substantially the crest of the preceding ridge and extends to the bottom of the trough directly ahead of the inner end of the side cutting edge. Thus each side cutting edge is supported by a piece of the strip, roughly triangular in shape as seen in plan, which extends over half a complete "wave-length," or ridge-and-trough combination; this supporting metal provides a strong support of the side cutting edge against forces encountered in normal cutting. It also strongly resists forces tending to lift the side cutting edges out of the general plane of the strip. Such forces are not produced in normal cutting, but will occur if the side of the strip is inadvertently snagged on a workpiece, vice, or the like, which is a common hazard. Mere flat tongues of the same gauge metal extending sideways would easily be bent out of proper position, and the cutting strip ruined in consequence, not only for side cutting, but for almost any cutting operation; the corrugation of the support metal for the side cutting edges prevent this, except when altogether exceptional stresses are applied.

The sharpness of the side cutting edges 51, which together with their method of production are described above with reference to FIGURES 10 to 13, naturally depends on how close the punch 60 approaches the die 65. Ideally the punch should nearly touch the die: but it will be appreciated that if through some accident, wear or maladjustment the punch drives into the die both will be damaged, and the punching machine as well in all probability. Therefore for safety the punch is preferably set to terminate its downward travel somewhat short of the die: as a result the edge 51' is somewhat rounded as above described. The greater the final clearance between punch and die the blunter and more indeterminate the edge 51'. In the extreme case no coining or squeezing of the metal occurs and no edge 51', properly speaking, is formed at all; merely the full thickness of the metal is displaced to bring one surface at the side edge of the element level with the edges 5'. This result, though inferior to what is shown in FIGURES 10 to 13, is nevertheless better than the element of FIGURES 5 and 6 where the side cutting edges lie below the edges 5.

In a modification of what is shown in FIGURE 3 the lugs 18 are made narower so that while the element can be secured on a backing member as shown in FIGURE 4 it can also be displaced somewhat laterally to bring the side edge 2 clear of the side member 17, thus allowing it to be used to form a groove or under cut a shoulder.

The method of mounting the cutting element illustrated in FIGURES 1 to 4 can be used for the other elements mentioned herein.

I claim:
1. A cutting tool comprising a thin flexible cutting strip composed of a hardened ferrous material having a multiplicity of holes in parallel rows, a multiplicity of cutting edges each formed by one hardened and sharpened edge of a hole, and ridges formed by reversibly bending the strip along lines parallel to the rows of holes, the edges extending from the ridges above the general plane formed thereby, the strip also having, at alternate ridges along one side edge, side cutting edges which are located in substantial alignment with the edges at the corresponding ridges and are formed by cutting away portions of the strip at that side, and the cutting edges at the holes and the side overlapping for continuous cutting up to said side, the side cutting edges having the same projection and same angles of rake and clearance as the edges at the holes, and being less sharp than the edges at the holes.

2. A cutting tool as claimed in claim 1 which further comprises a backing member presenting a supporting area in contact with the rear of the cutting strip which area extends up to said side and has its width substantially equal to the length of the side cutting edges.

3. A cutting tool as claimed in claim 1 which further comprises a backing member including a portion tapering towards said cutting strip and contacting same at points along a line which is substantially parallel to and spaced just inwardly from the side of the cutting strip which contains said side cutting edges.

4. In the manufacture of a cutting strip having a multiplicity of holes in parallel rows, a multiplicity of parallel cutting edges each formed by one hardened and sharpened edge of a hole, and a multiplicity of side cutting edges along one side of said grip, the steps comprising forming cutouts along said side of the strip, one side of each cutout being straight and being adapted to align with the cutting edges of said holes, and coining the straight side of each cutout to form said side cutting edges.

5. A method of making a cutting strip including the steps of forming holes in a flat strip along a series of parallel rows, forming a cutting edge at one straight side of each hole which edge has zero clearance angle, forming cut-outs along at least one side of the strip one side of each cut-out being straight and aligned with the cutting edges of one of said rows, coining the straight side of each cut-out to produce a side cutting edge having the same rake angle and projection as the cutting edges at the holes and having also zero clearance, and ridging the strip to cause all the cutting edges to project similarly from the crests of the ridges with equal clearance angles.

6. A method as claimed in claim 5, including the steps of forming locating notches along a marginal area at said one side of the strip and forming the cutouts while removing the marginal area.

7. A method of making a cutting strip comprising the steps of forming holes in a flat strip along a series of parallel rows, forming cutting edges at corresponding sides of the holes, said sides all facing in the same general direction for cutting by said strip over a continuous area when said strip is moved in that direction over a work, forming spaced cut-outs along at least one side of the strip, coining the edges of the cut-outs which face in said general direction whereby to form cutting edges for cutting over an area which extends to the side edge and overlaps said first-mentioned area when said strip is moved in said direction over the work.

8. A method as claimed in claim 7, wherein said cutting edges and said cut-outs are formed in aligned parallel rows and the strip is corrugated to produce ridges parallel to the rows with the cutting edges at the crests of the ridges.

9. A method as claimed in claim 7, wherein said cutting edges and said cut-outs are formed in aligned parallel rows and initially zero clearance angles and the strip is corrugated to produce ridges parallel to the rows with the cutting edges at the crests of the ridges and having equal positive clearance angles.

References Cited by the Examiner

UNITED STATES PATENTS

| | | | |
|---|---|---|---|
| 1,751,034 | 3/30 | Erb | 29—78 |
| 2,143,063 | 1/39 | Fetterolf | 29—78 |
| 2,467,302 | 4/49 | Forster et al. | 76—89.2 X |
| 2,678,571 | 5/54 | Booth | 76—101 |
| 2,708,376 | 5/55 | Booth | 76—24 |
| 2,769,225 | 11/56 | Booth | 29—78 |
| 2,816,351 | 12/57 | Sauers | 29—78 |
| 3,000,077 | 9/61 | Oxford | 29—78 |

ANDREW R. JUHASZ, *Primary Examiner.*

LEON PEAR, *Examiner.*